(12) United States Patent
Cardell et al.

(10) Patent No.: US 8,944,764 B2
(45) Date of Patent: Feb. 3, 2015

(54) MAIN ROTOR ARRANGEMENT OF AN UAV-HELICOPTER

(75) Inventors: Per-Erik Cardell, Linköping (SE); Kjell Stenbom, Norrköping (SE)

(73) Assignee: SAAB AB, Linköping (SE)

( * ) Notice: Subject to any disclaimer, the term of this patent is extended or adjusted under 35 U.S.C. 154(b) by 640 days.

(21) Appl. No.: 13/377,737

(22) PCT Filed: Jun. 10, 2009

(86) PCT No.: PCT/SE2009/050704
§ 371 (c)(1),
(2), (4) Date: Feb. 29, 2012

(87) PCT Pub. No.: WO2010/144003
PCT Pub. Date: Dec. 16, 2010

(65) Prior Publication Data
US 2012/0183401 A1 Jul. 19, 2012

(51) Int. Cl.
*B64C 27/35* (2006.01)
*B64C 27/08* (2006.01)
*B64C 27/43* (2006.01)

(52) U.S. Cl.
CPC ........... *B64C 27/43* (2013.01); *B64C 2201/024* (2013.01); *Y10S 416/50* (2013.01)
USPC ......................... 416/134 A; 416/148; 416/500

(58) Field of Classification Search
CPC ...... B64C 27/43; B64C 27/51; B64C 27/001; B64C 2201/024; B64C 2027/001; B64C 2027/003; Y01S 416/50
USPC ............ 416/134 A, 140, 148, 167, 500, 106, 416/146 R
See application file for complete search history.

(56) References Cited

U.S. PATENT DOCUMENTS

| | | | |
|---|---|---|---|
| 2,235,605 A | | 3/1941 | Bugatti |
| 2,475,333 A | | 7/1949 | Morris |
| 2,530,467 A | * | 11/1950 | Hunt ............................... 464/92 |
| 2,672,202 A | | 3/1954 | Pullin et al. |
| 2,949,254 A | | 8/1960 | Bauer |
| 3,288,226 A | * | 11/1966 | Lemont, Jr. et al. .......... 416/114 |
| 3,804,552 A | * | 4/1974 | Covington ................ 416/134 R |

(Continued)

FOREIGN PATENT DOCUMENTS

| | | |
|---|---|---|
| DE | 9012876 U1 | 11/1990 |
| DE | 202008002249 U1 | 4/2008 |
| WO | WO-2008/085547 A2 | 7/2008 |

OTHER PUBLICATIONS

European Search Report—Oct. 2, 2013 (Issued in Counterpart Application No. 09845904.3).

(Continued)

*Primary Examiner* — Nathaniel Wiehe
*Assistant Examiner* — Wayne A Lambert
(74) *Attorney, Agent, or Firm* — Venable LLP; Eric J. Franklin

(57) ABSTRACT

A main rotor arrangement for an UAV-helicopter. A rotor mast defines a vertical axis of rotation. A hub is for attachment of rotor blades. The hub is mounted to the rotor mast in a tiltable way so as to reduce loads acting on the rotor blades during operation of the UAV-helicopter. A damping assembly is configured to damp the tilting of the hub.

4 Claims, 2 Drawing Sheets

(56) References Cited

U.S. PATENT DOCUMENTS

| | | | |
|---|---|---|---|
| 3,890,061 A * | 6/1975 | Nechay | 416/134 R |
| 4,073,600 A | 2/1978 | Doman | |
| 4,092,084 A | 5/1978 | Barltrop | |
| 4,115,031 A * | 9/1978 | Drees et al. | 416/134 A |
| 4,297,078 A | 10/1981 | Martin | |
| 4,333,728 A | 6/1982 | Drees et al. | |
| 4,419,051 A | 12/1983 | DeRosa | |
| 4,452,591 A * | 6/1984 | Fishbaugh et al. | 464/89 |
| 4,575,310 A * | 3/1986 | Otani | 416/134 R |
| 4,708,591 A * | 11/1987 | Roman | 416/102 |
| 4,754,958 A | 7/1988 | Markowski | |
| 5,372,478 A | 12/1994 | McCafferty | |
| 5,544,844 A | 8/1996 | Groen et al. | |
| 2009/0115636 A1 | 5/2009 | Shibata | |
| 2010/0012769 A1* | 1/2010 | Alber et al. | 244/17.23 |

OTHER PUBLICATIONS

PCT/ISA/210—International Search Report—Mar. 4, 2010.
PCT/ISA/237—Written Opinion of the International Searching Authority—Mar. 4, 2010.
PCT/IPEA/409—International Preliminary Report on Patentability—Jan. 6, 2011.

* cited by examiner

MAIN ROTOR ARRANGEMENT OF AN UAV-HELICOPTER

CROSS-REFERENCE TO RELATED APPLICATIONS

This application is the national phase under 35 U.S.C. §371 of PCT/SE2009/050704 filed 10 Jun. 2009.

FIELD OF THE INVENTION

The present invention relates to a main rotor arrangement. The invention also relates to an UAV-helicopter comprising such an arrangement.

BACKGROUND OF THE INVENTION

The main rotor blades of an UAV-helicopter (UAV, Unmanned Aerial Vehicle) are subjected to loads during operation, e.g. pulsating bending forces which are transmitted from the rotor blades to the vertical rotor mast. The rotor mast is provided with a hub to which the rotor blades are mounted with the aid of rotor blade holders. One way of reducing the loads acting on the rotor blades is to make the hub tiltable so that the hub is allowed to deflect with respect to the rotor mast when subjected to said loads. As a result, the loads acting on the rotor blades can be reduced.

Such main rotor arrangements are disclosed in U.S. Pat. No. 4,092,084 and U.S. Pat. No. 5,544,844. The disclosed solutions are provided with end stops so that the maximum deflection can be restricted, but they are not capable of controlling the deflection in any other way.

OBJECT OF THE INVENTION

An object of the present invention is thus to provide a main rotor arrangement where the deflection of the hub can be controlled in a better way.

SUMMARY OF THE INVENTION

This object is solved by means of a main rotor arrangement.

Since the main rotor arrangement comprises a damping assembly for damping said tilting of the hub the deflection can be controlled in a better way compared to the prior art solutions, which only are provided with end stops.

Suitably, the hub is hollow and concentrically arranged about the rotor mast so as to form a circumferential gap between the hub and the rotor mast. Herby a required space for the deflection of the hub is achieved.

Suitably, the damping assembly comprises a detachable damper element adapted to act as a damping support between the hub and the rotor mast. Hereby a simple and inexpensive solution is achieved. Since the damper element is detachable, it also becomes possible to change between damper elements with different hardness and thus different damping performance.

Advantageously, the damping performance of the damping assembly is adjustable. Hereby, the main rotor arrangement can handle loads of different size, e.g. use of rotor blades of greater lengths which would imply greater loads.

Preferably, the damping assembly also comprises a hollow receptacle being attached to a lower side of the hub and concentrically about the rotor mast, wherein the damper element is contained within the receptacle. Hereby, the damper element can be protected within the receptacle and its performance can be determined by the size and shape of the receptacle. Since the damper element is contained within the receptacle, removal and insertion of the damper element is also facilitated.

Suitably, the damper element is compressible or expandable within the receptacle. Hereby, a suitable way of adjusting the damping performance of the damping assembly is achieved.

Advantageously, the receptacle comprises a lower opening being provided with internal threads and a disc being provided with external threads for engagement with the internal threads, whereby the disc can be moved into or out from the receptacle by means of the threads so as to compress or expand the damper element contained within the receptacle. Hereby, the hardness of the damper element and the performance of the damping assembly can be adjusted. Moreover, due to the threads the adjustability becomes simple.

Suitably, the damper element is ring-shaped and arranged concentrically about the rotor mast. Herby, a uniform damping performance can be achieved.

BRIEF DESCRIPTION OF THE INVENTION

The present invention will now be described with reference to the accompanying drawing, on which:

DETAILED DESCRIPTION OF THE INVENTION

Figure 1:
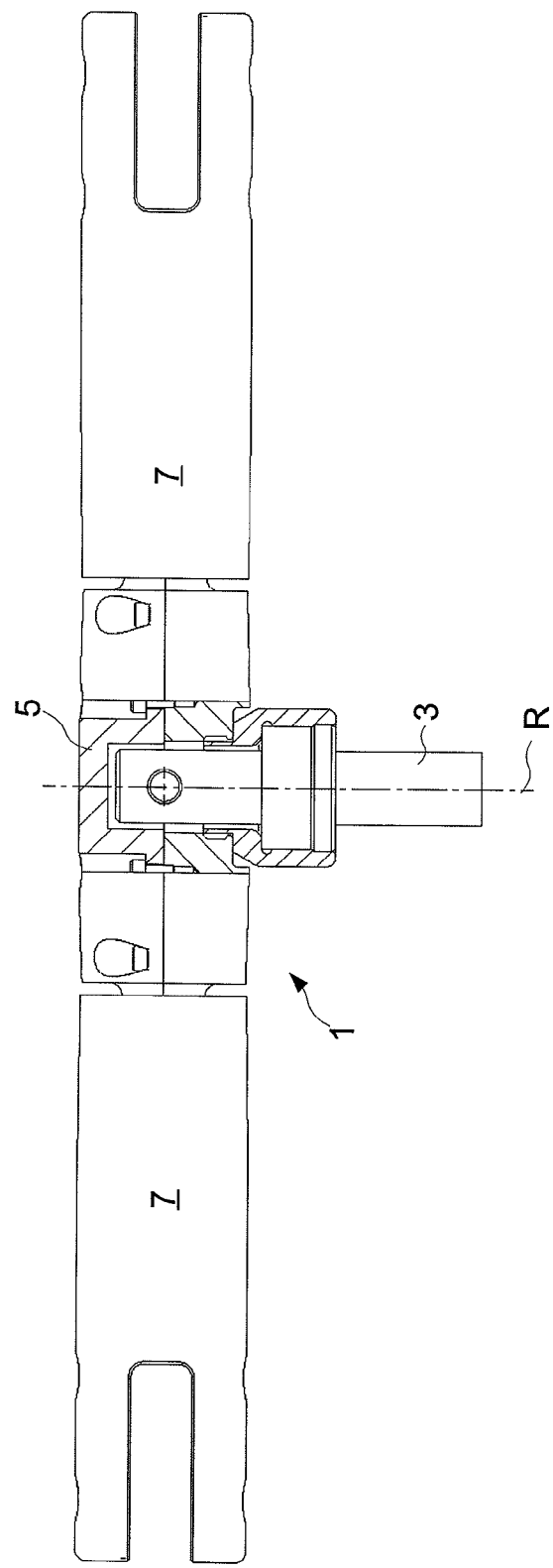
FIG. 1 shows a partly sectioned view of a main rotor arrangement according to the present invention.

FIG. 1 shows a main rotor arrangement 1 of a not shown UAV-helicopter. The arrangement comprises a rotor mast 3 defining an axis of rotation R, a hub 5 and rotor blade holders 7 being attached to the hub 5.

Figure 2:
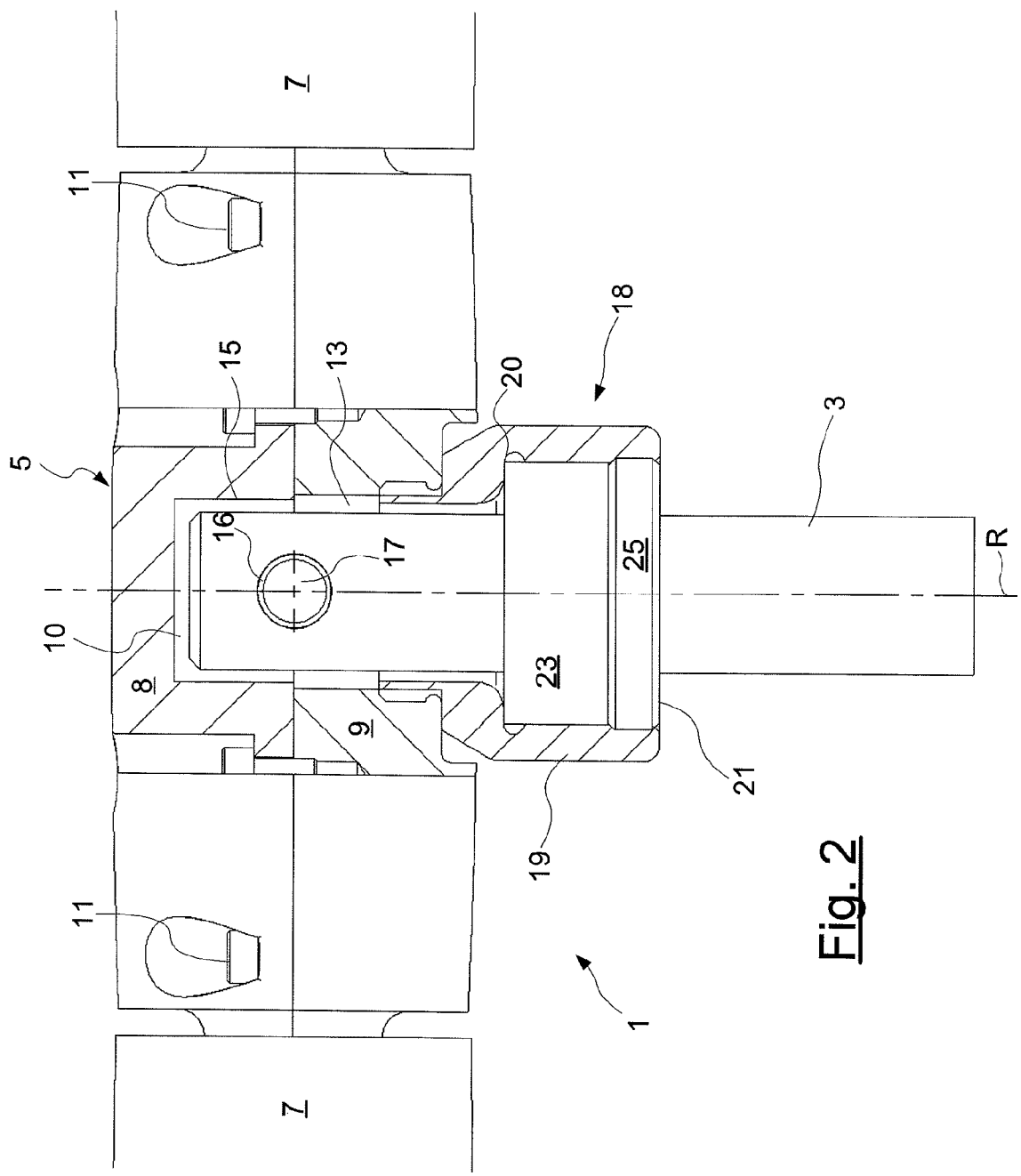
FIG. 2 shows an enlargement view of FIG. 1.

As seen in FIG. 2 the hub 5 comprises an upper hub half 8 and a lower hub half 9 which are joined by means of bolts 11. Both hub halves are hollow and together form a cylindrical inner space 10, which is defined by inner walls 15 of the hub halves. The inner space 10 has an inner diameter that is greater than the outer diameter of the rotor mast 3. The rotor mast comprises a pin extending through the rotor mast in a direction being perpendicular to the axis of rotation R. The hub halves are concentrically arranged on top of the rotor mast 3 whereby a circumferential uniform gap 13 is formed between the hub inner walls 15 and the periphery of the rotor mast 3. The hub 5 is suspended by the pin 17 by means of bearings 16, and the pin defines a horizontal pivot axis or teetering axis, so that the hub 5 becomes tillable about the teetering axis 17. Due to the circumferential gap 13, the hub is allowed to tilt or deflect with respect to the axis of rotation R. The amount of the deflection is determined by the size of the gap.

The rotor blade holders 7 are clamped between the hub halves 8, 9 and serve to hold not shown rotor blades, which can vary in shape and length depending on the application of the UAV-helicopter. The blade holders 7 thus permit easy exchange of such rotor blades, and also allow for easy transportation of the UAV-helicopter since the rotor blades are detachable.

A damping assembly 18 is attached to an underside of the lower hub 9 half by means of not shown bolts and comprises a hollow receptacle or cup 19 in which a damper element 23 is detachably arranged. The damper element is ring-shaped and arranged about the rotor mast. The receptacle 19 is made from a rigid material while the damper element is made from a compressible material such as rubber and which material can be varied depending on the desired damping performance. The receptacle 19 is arranged concentrically about the rotor mast 3 and is provided with a lower opening 21. The interior of the receptacle 19 comprises a shoulder 20 functioning as a support for the damper element 23. A disc 25 is arranged in the lower opening which is provided with internal threads, while the disc 25 is provided with external threads matching the internal threads. The disc 25 can by means of the threads be moved into or out from the receptacle. Thus, the disc 25 can force the damper element 23 to compress when the disc is moved into the receptacle 19, or to become expanded when the disc is moved out from the receptacle 19. Thereby, the hardness of the damper element, i.e. thereby the damping performance of the damping assembly can be adjusted.

During operation of the UAV-helicopter, the rotor blades are exposed to loads, but due to the tiltable suspension of the hub these loads can be reduced. The hub is allowed to deflect about the teetering axis 17 due to the pin suspension and the existence of the gap 13 between the hub inner walls 15 and the rotor mast 3. Consequently, the hub will press the damping assembly 18 against the rotor mast 3. Depending on the position of the disc 25 within the receptacle the hardness of the damper element, i.e. the amount of deflection can be controlled.

The invention claimed is:

1. A main rotor arrangement for an UAV-helicopter, the main rotor arrangement comprising:
a rotor mast defining a vertical axis of rotation,
a hub for attachment of rotor blades, wherein the hub is mounted to the rotor mast in a tiltable way so as to reduce loads acting on the rotor blades during operation of the UAV-helicopter,
a damping assembly comprising a hollow receptacle being attached to a lower side of the hub and concentrically about the rotor mast, wherein the receptacle comprises a detachable damper element adapted to act as a damping support between the hub and the rotor mast for damping said tilting of the hub, wherein the receptacle comprises a lower opening comprising internal threads and a disc comprising external threads for engagement with the internal threads, whereby the disc can be moved into or out from the receptacle by the threads so as to compress or expand the damper element contained within the receptacle to make the damping performance of the damping assembly adjustable.

2. The main rotor arrangement according to claim 1, wherein the hub is hollow and concentrically arranged about the rotor mast so as to form a circumferential gap between the hub and the rotor mast.

3. The main rotor arrangement according to claim 1, wherein the damper element is ring-shaped and arranged concentrically about the rotor mast.

4. A UAV-helicopter, comprising:
a main rotor arrangement according to claim 1.

* * * * *